US012791359B2

(12) United States Patent
Barbul et al.

(10) Patent No.: US 12,791,359 B2
(45) Date of Patent: Nov. 10, 2026

(54) INDUCTIVE POSITION MEASURING SYSTEM FOR DETERMINING A MOVEMENT ALONG A CURVED PATH

(71) Applicant: Infineon Technologies AG, Neubiberg (DE)

(72) Inventors: Andreas Barbul, Munich (DE); Richard Heinz, Munich (DE)

(73) Assignee: Infineon Technologies AG, Neubiberg (DE)

( * ) Notice: Subject to any disclaimer, the term of this patent is extended or adjusted under 35 U.S.C. 154(b) by 298 days.

(21) Appl. No.: 18/615,059

(22) Filed: Mar. 25, 2024

(65) Prior Publication Data

US 2024/0328829 A1 Oct. 3, 2024

(30) Foreign Application Priority Data

Mar. 28, 2023 (DE) ........................ 102023202826.3

(51) Int. Cl.
*G01D 5/20* (2006.01)
*G01B 7/30* (2006.01)

(52) U.S. Cl.
CPC ............ *G01D 5/2053* (2013.01); *G01B 7/30* (2013.01)

(58) Field of Classification Search
CPC ........ G01D 5/20; G01D 5/204; G01D 5/2053; G01D 2205/90; G01B 7/003; G01B 7/004; G01B 7/30; G06F 3/033; G06F 3/0338; G06F 3/0354
See application file for complete search history.

(56) References Cited

U.S. PATENT DOCUMENTS

| | | | | |
|---|---|---|---|---|
| 4,642,595 A * | 2/1987 | Ruumpol | G01D 5/2258 | 336/134 |
| 5,813,124 A * | 9/1998 | Freitag | G01D 5/145 | 33/534 |
| 5,831,554 A * | 11/1998 | Hedayat | G05G 9/047 | 341/20 |
| 5,969,520 A * | 10/1999 | Schottler | G05G 9/047 | 324/207.2 |

(Continued)

FOREIGN PATENT DOCUMENTS

| | | |
|---|---|---|
| DE | 102004056049 A1 | 6/2006 |
| DE | 102020113115 A1 | 11/2021 |

(Continued)

*Primary Examiner* — Steven L Yeninas
(74) *Attorney, Agent, or Firm* — Harrity & Harrity, LLP

(57) ABSTRACT

An inductive position measuring system includes metallic target and a flexible substrate having a first field coil and a first receiving coil arrangement, the first field coil and the first receiving coil arrangement each running along in a straight line on the flexible substrate. The metallic target is at a distance from the flexible substrate and is configured to provide an inductive coupling between the first field coil and the first receiving coil arrangement, the actual position of the metallic target being able to be determined based on this inductive coupling. The metallic target moves relative to the flexible substrate, with the metallic target being able to be deflected along a coordinate line on a curved path. The flexible substrate is curved such that the first field coil running and the first receiving coil arrangement are likewise curved and extend parallel to the coordinate line.

18 Claims, 13 Drawing Sheets

(56) References Cited

U.S. PATENT DOCUMENTS

| | | | | |
|---|---|---|---|---|
| 6,043,806 | A * | 3/2000 | Atwell | G05G 9/047 345/161 |
| 6,131,457 | A * | 10/2000 | Sato | G01P 15/11 73/514.31 |
| 6,320,284 | B1 * | 11/2001 | Fontana | G05G 9/047 345/161 |
| 6,480,183 | B1 | 11/2002 | Van Ruymbeke et al. | |
| 7,443,159 | B2 | 10/2008 | Habenschaden et al. | |
| 2004/0124717 | A1 * | 7/2004 | Corcoran | H02K 41/031 345/161 |
| 2006/0144166 | A1 | 7/2006 | Ruehl et al. | |
| 2010/0090689 | A1 * | 4/2010 | Furuki | G01D 5/145 324/207.24 |
| 2010/0141245 | A1 * | 6/2010 | Lee | G01D 5/2258 324/207.25 |
| 2014/0049252 | A1 * | 2/2014 | Taniguchi | G01D 5/2053 324/207.21 |
| 2014/0132253 | A1 * | 5/2014 | Bertin | G01D 5/2053 324/207.17 |
| 2020/0025550 | A1 * | 1/2020 | Utermoehlen | G01B 7/30 |
| 2020/0371625 | A1 * | 11/2020 | Katsurahira | G06F 3/04166 |
| 2023/0152075 | A1 * | 5/2023 | Pichler | G01L 5/221 324/207.21 |
| 2023/0332930 | A1 * | 10/2023 | Matsuura | G06F 3/046 |
| 2024/0077338 | A1 * | 3/2024 | Kuntz | G01D 5/2053 |

FOREIGN PATENT DOCUMENTS

| | | | |
|---|---|---|---|
| EP | 0872809 | A1 | 10/1998 |
| EP | 1672323 | A2 | 6/2006 |

* cited by examiner

INDUCTIVE POSITION MEASURING SYSTEM FOR DETERMINING A MOVEMENT ALONG A CURVED PATH

CROSS-REFERENCE TO RELATED APPLICATION

This application claims priority to German Patent Application No. 102023202826.3 filed on Mar. 28, 2023, the content of which is incorporated by reference herein in its entirety.

TECHNICAL FIELD

The innovative concept described herein relates to a device for ascertaining a current position for an object that moves on a curved path. The position determination is carried out using inductively measuring sensors.

BACKGROUND

Exact determination of the actual position of a moving item is desirable in many applications. Various measurement principles may be applied for this. By way of example, magnetic position measurements are known wherein magnetic field sensors ascertain the magnetic field issuing from a magnetic component, the magnetic field information being taken as a basis for determining the current actual position of the magnetic component. The magnetic field measurements have only a limited accuracy, however. The magnetic field sensors are also susceptible to external interfering fields.

Potentiometric position measurements are likewise known. These measurement principles also have only a limited accuracy. They are moreover relatively susceptible to mechanical wear.

Optical sensors are also often used to determine the position of an object. These measurement principles are typically subject to the usual optical limitations, however. As such, optical measurements are generally able to be performed only in sufficiently clear visibility conditions. The measurement equipment required is also usually relatively bulky.

The aforementioned limitations mean that inductive measurement principles are today increasingly being implemented to exactly determine the actual position of a moving item. No magnetic components are needed, and so the measurements also encounter no external influences from magnetic stray fields. Inductive measuring systems can also be manufactured on a very small scale, and they are able to be used even under difficult external conditions.

Inductive measuring devices can measure movements within a planar surface, e.g., in two-dimensional space. These are normally simple translational movements within the planar surface, and simple rotations within the planar surface. Position determination for a movement on a curved surface, in particular movements in three-dimensional space, can be achieved only with a high level of equipment outlay, however.

By way of example, this relates to position determination for components arranged on a multidimensional joint, as may be the case in joysticks or robot arms, for example. An example of a multidimensional joint such as this would be a Cardan joint, also referred to as a U-joint or universal joint. A universal joint such as this allows rotational movements in two degrees of freedom, which means that a component attached thereto can move on a spherical segment. This is accordingly a multidimensional movement on a curved surface. As mentioned at the outset, induction-based position determinations in the case of multidimensional movements are possible only when a high level of equipment outlay is employed. By way of example, multiple inductively measuring devices that each measure in one spatial direction need to be provided. However, this leads to heightened demands on the complexity of the overall system, accompanied by enlarged dimensions, and also to directly associated increased production costs.

It would therefore be desirable to improve inductive position measuring systems so that uncomplicated and inexpensive equipment, which may also be installed in the respective application in as space-saving a manner as possible, can be used to ascertain the actual position of a moving object in three-dimensional space.

SUMMARY

An improved inductive position measuring system that can be used to ascertain the actual position of a moving object in three-dimensional space is described herein. The inductive position measuring system comprises a flexible substrate having a first field coil and a first receiving coil arrangement, the first field coil and the first receiving coil arrangement each running along in a straight line on the substrate. The inductive position measuring system further comprises a metallic target that is at a distance from the substrate and configured to provide an inductive coupling between the first field coil and the first receiving coil arrangement, the actual position of the target being able to be determined based on this inductive coupling. The target is able to be attached to a component that moves relative to the substrate and the position of which is intended to be determined, the moving component together with the target being able to be deflected along a first coordinate line on a curved path. According to the innovative concept presented herein, the substrate is curved, which means that the first field coil, which is situated on the substrate and runs in a straight line, and the first receiving coil arrangement, which is situated on the substrate and runs in a straight line, are likewise curved and extend along this first coordinate line.

Other implementations and advantageous aspects of this inductive position measuring system are specified in the respective dependent patent claims.

BRIEF DESCRIPTION OF THE DRAWINGS

Some example implementations are illustrated by way of example in the drawing and are explained below. In the figures.

DETAILED DESCRIPTION

Example implementations are described in more detail hereinbelow with reference to the figures, wherein elements having the same or a similar function are provided with the same reference signs.

Method steps that are illustrated or described in the context of the present disclosure may also be carried out in an order other than that illustrated or described. In addition, method steps relating to a particular feature of a device are interchangeable with that feature of the device, and this also applies the other way round.

Figure 1:
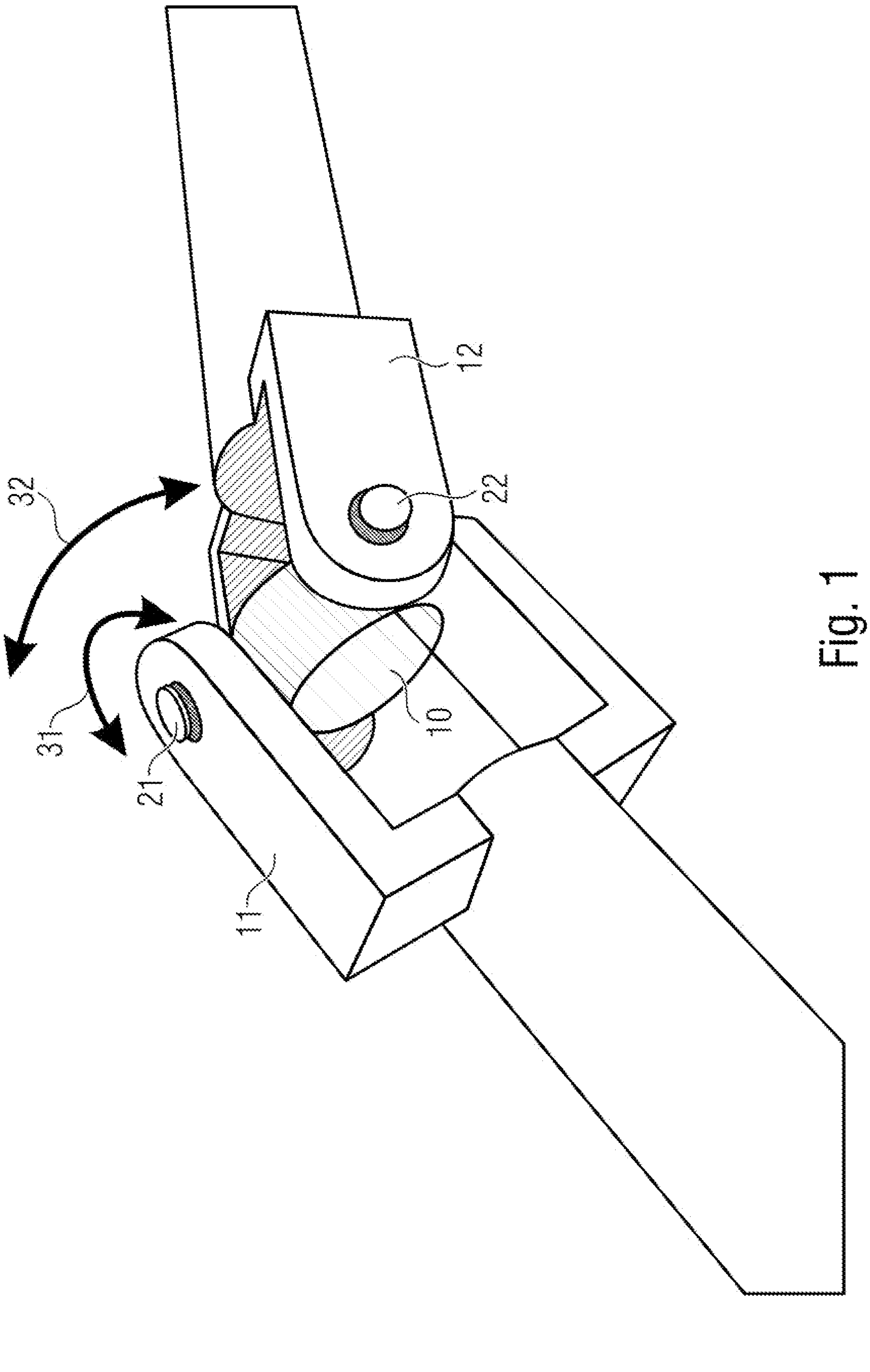
FIG. 1 shows a schematic perspective view of a U-joint having two degrees of freedom.

By way of introduction, FIG. 1 shows a perspective view of a U-joint 10, also referred to as a Cardan joint or universal joint. The U-joint 10 rotatably connects two shafts 11, 12 to one another. Each shaft 11, 12 has a rotation axis 21, 22. The two rotation axes 21, 22 are offset from one another by 90° and extend through the U-joint 10. This allows one shaft 11 to move relative to the other shaft 12 in two rotational degrees of freedom 31, 32. The degrees of freedom are also referred to as DOFs.

Assuming that one of the two shafts 11, 12 is rigidly clamped, the freely moving shaft can form a movement on a spherical segment. The freely moving shaft thus moves three-dimensionally in space in two independent degrees of freedom 31, 32.

Figure 2:
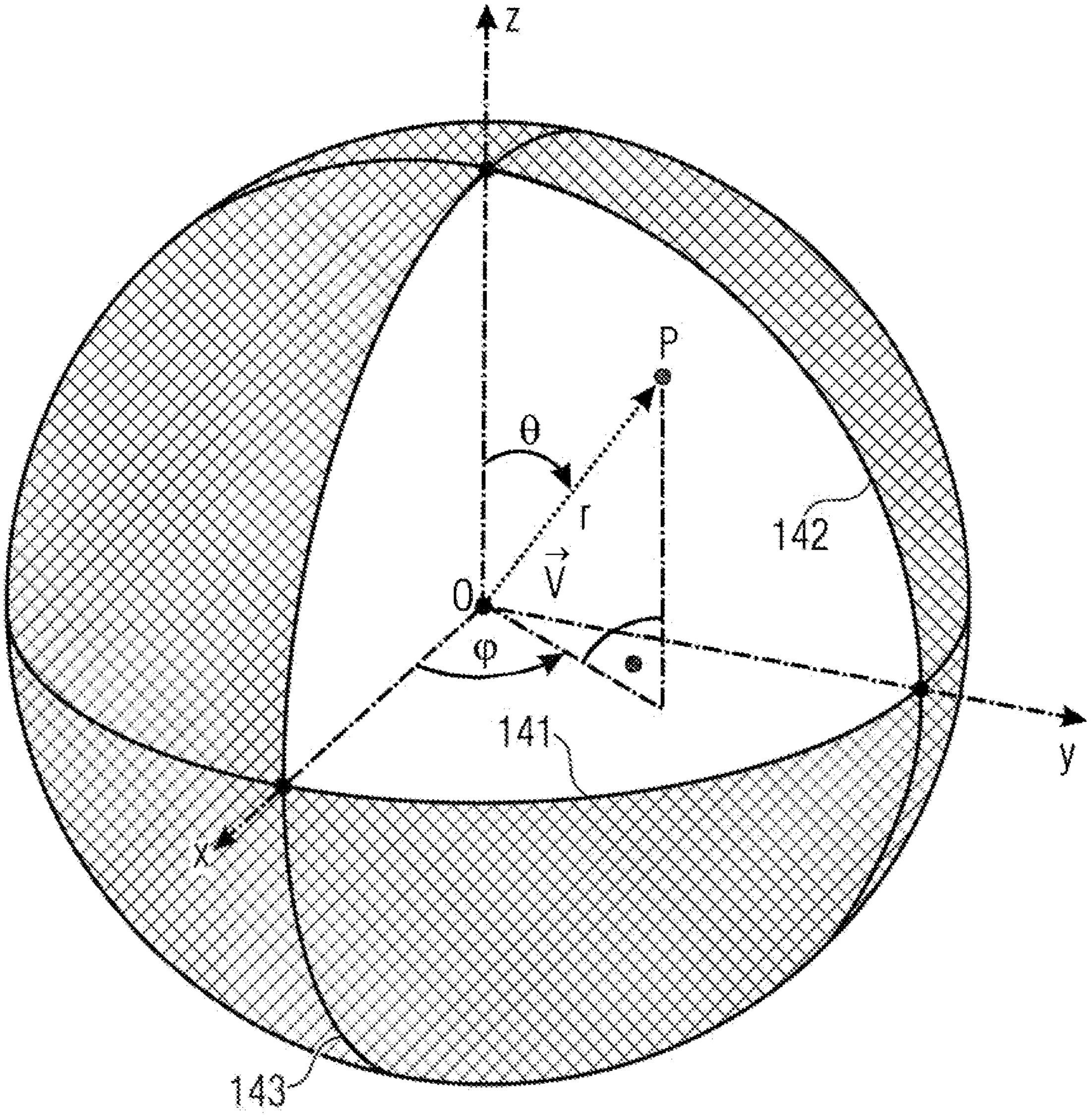
FIG. 2 shows a schematic view of a sliced sphere to describe polar coordinates.

FIG. 2 shows the movement of a point P in three-dimensional spherical space. The position of the point P can be defined using spherical or polar coordinates, r indicating the distance from the origin O, and thus the radius of movement, the angle θ describing what is known as the pole distance angle, and the angle φ referring to what is known as the azimuth angle. In the case of the universal joint described previously, the depicted vector $\vec{V}$ would correspond to the freely moving shaft. Since the length of the freely moving shaft is invariable due to its design, the radius of movement r is also invariable.

The point P would correspond to the axial end of the shaft, which can therefore now move only in two degrees of freedom, specifically along the azimuth angle φ and along the pole distance angle θ. The point P, e.g., the end of the shaft, can therefore move on the entire sphere surface of the sphere having the radius r depicted by way of illustration.

If one of these two degrees of freedom were restricted, on the other hand, the point P, e.g., the end of the shaft, would merely extend along a coordinate line running on the sphere surface. If for example the pole distance angle θ were restricted, the vector $\vec{V}$ would be fixed in the x-y plane, for example, and would only be able to move along the coordinate line 141. If, on the other hand, the azimuth angle φ were restricted, the vector $\vec{V}$ would be fixed in the y-z plane, for example, and would only be able to move along the coordinate line 142. If the vector $\vec{V}$ were fixed in the x-z plane, it would only be able to move along the coordinate line 143, for example.

The term coordinate line is thus used in its original sense within the present disclosure, e.g., a coordinate line in a coordinate system denotes a curve on which all coordinates except for one are constant.

That is to say that if for example a shaft has only one of the depicted degrees of freedom θ or φ then the end of the shaft, e.g., the point P, moves exactly on an individual coordinate line 141, 142, 143. This corresponds to a pendulous movement having one degree of freedom. If, on the other hand, the shaft has both depicted degrees of freedom θ and φ, then the end of the shaft, e.g., the point P, can move along multiple coordinate lines 141, 142, 143 simultaneously, and therefore on the entire sphere surface. This in turn corresponds to a pivoting movement having two degrees of freedom, the resultant movement space being spherical-segment-shaped.

Since the degrees of freedom of a mechanical joint and the resultant movement options in spherical space, and the term coordinate line, have been defined, the innovative inductive position measuring system presented herein is described in more detail below.

Figure 3:
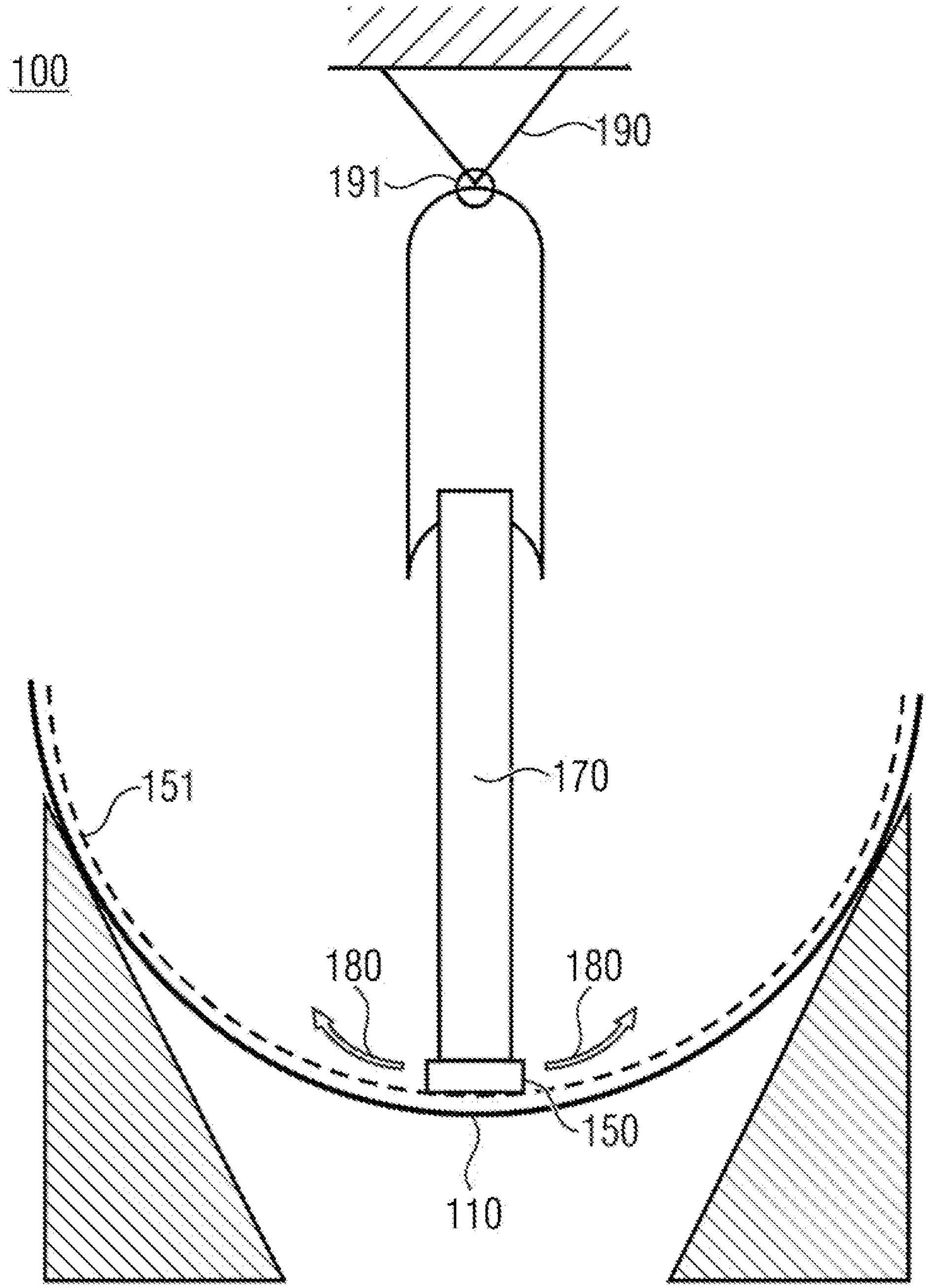
FIG. 3 shows a schematic side view of an inductive position measuring system for measuring the position of a moving target having precisely one degree of freedom according to one example implementation.

FIG. 3 shows an inductive position measuring system 100 according to one example implementation. The inductive position measuring system 100 comprises a flexible substrate 110, which is depicted in FIG. 4 in a plan view.

The flexible substrate 110 comprises a first field coil 111 and a first receiving coil arrangement 120. As explained below, the receiving coil arrangement 120 comprises multiple individual windings 131, 132, 133, 134 running in a more or less undulating manner. The entire receiving coil arrangement 120, however, just like the first field coil 111, runs along in a straight line on the flexible substrate 110. As depicted purely by way of illustration here, the flexible substrate 110 may be strip-shaped. However, it would also be conceivable for the flexible substrate 110 to have other geometric shapes.

The inductive position measuring system 100 furthermore comprises a metallic target 150 that is at a distance from the substrate 110. The metallic target 150 is configured to provide an inductive coupling between the first field coil 111 and the first receiving coil arrangement 120, the actual position of the target 150 being able to be determined based on this inductive coupling. For further explanation in this regard, reference will be made to FIG. 4.

Figure 4:
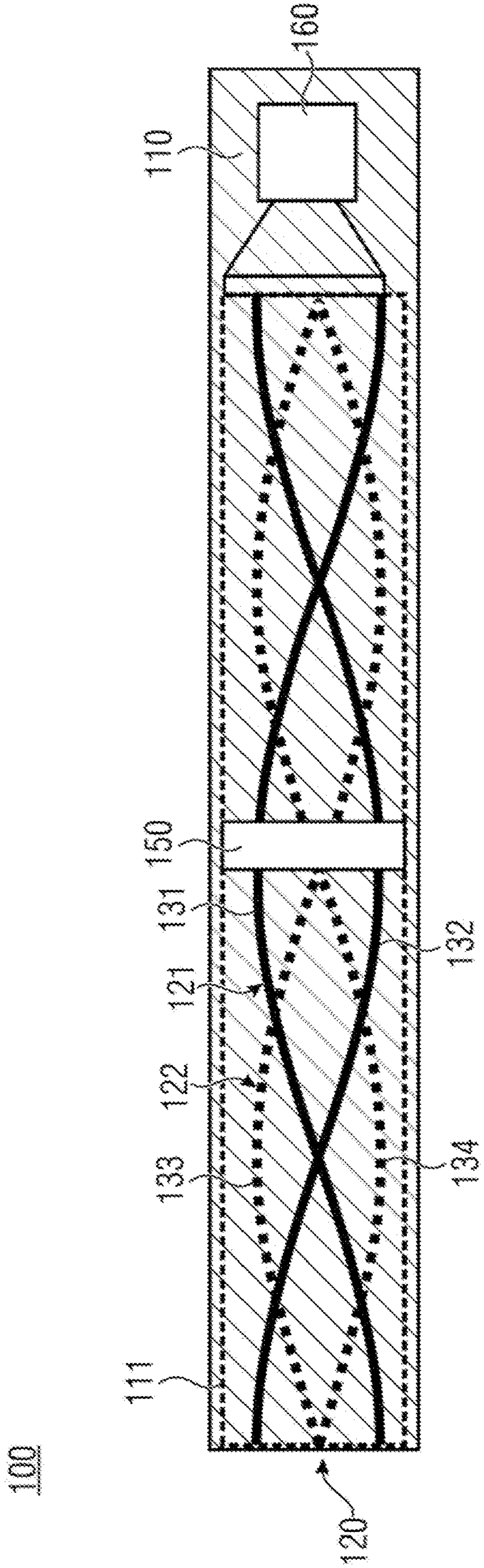
FIG. 4 shows a schematic plan view of an inductive position measuring system for measuring the position of a moving target having precisely one degree of freedom according to one example implementation.

As can be seen in FIG. 4, the field coil 111 may be in the form of a simple conductor loop, for example. This may be arranged circumferentially around the receiving coil arrangement 120, for example. The field coil 111 can have a current or voltage signal applied to it, in which case the field coil 111 produces an induction field. The induction field reaches the metallic target 150, in which an induced current is produced, which itself in turn produces an opposing induction field. This opposing induction field can then be received by the first receiving coil arrangement 120. The receiving coil arrangement 120 may therefore also be referred to as a pickup coil arrangement in the customary jargon of this field of the art.

In response to the received opposing induction field, the receiving coil arrangement 120 generates an output signal that can be processed for example by a control unit 160, e.g., in the form of an Application Specific Integrated Circuit (ASIC). This output signal is dependent on the position of the target 150 relative to the receiving coil arrangement 120, and so the control unit 160 can infer an unambiguous actual position for the target 150 therefrom.

To generate an unambiguous signal over the entire path length, and therefore to ascertain an unambiguous actual position, the receiving coil arrangement 120 can comprise a first receiving coil 121 and a second receiving coil 122. Due to their specific geometry and the relative arrangement in relation to one another, the receiving coils 121, 122 are also referred to as the sine coil 121 and the cosine coil 122. The sine coil 121 and the cosine coil 122 are arranged so as to have a phase offset of 90° in relation to one another.

Both the sine coil 121 and the cosine coil 122 may each be astatic. For this, the sine coil 121 comprises two individual coil windings 131, 132 that have a phase offset of 180° in relation to one another. The cosine coil 122 also comprises two individual coil windings 133, 134 that have a phase offset of 180° in relation to one another. Owing to this arrangement of the windings, a respective differential output signal that can be used to compensate for homogeneous external interfering fields can be generated both in the sine coil 121 and in the cosine coil 122. The receiving coils 121, 122 are therefore also referred to as astatic receiving coils.

As can be seen in FIG. 3, the target 150 may be attached to a component 170 that moves relative to the substrate 110. The position of this component 170 is intended to be determined using the inductive position measuring system 100. To this end, the target 150 is attached to the component 170. The moving component 170, together with the target 150 arranged thereon, is able to be deflected along a first coordinate line 151. This first coordinate line 151 is a curved polar coordinate line as described previously with reference to the polar coordinate lines 141, 142, 143 depicted by way of illustration in FIG. 2. The target 150 therefore moves on a circular path segment predefined by the polar coordinate line 151, e.g., on a segment or a portion of a circular path. That is to say that the target 150 is therefore able to be deflected on a curved path. This deflection is symbolized by the arrows 180.

The deflection 180 substantially corresponds to a previously described pendulous movement having one degree of freedom, e.g., the component 170 with the target 150 arranged thereon can move to and fro on precisely one curved coordinate line 151. By way of example, this pendulous movement 180 may arise as a result of the moving component 170 having only a single degree of freedom, for example arising owing to the component 170 being clamped or mounted. As indicated by way of illustration in FIG. 3, the component 170 may be mounted for example on a fixed bearing 190 having precisely one rotation axis 191. Other example implementations, which are explained in greater detail with reference to the figures that follow, provide for the component 170 to be able to have two degrees of freedom, which means that the component 170 together with the target 150 arranged thereon can move on a spherical segment in the form of a pivoting movement.

By way of example, the component 170 may be a specifically clamped or mounted axis of a joystick. Appropriately mounted robot axes, e.g., in robot arms, would also be conceivable. Since the component 170 generally has an invariable length, the radius of movement of the component 170 is likewise invariable. This results in the curved coordinate line 151 shown schematically in FIG. 3, along which the component 170 can move to and fro.

As shown by way of illustration in FIG. 3, the target 150 may preferably be attached to an axial end of the component 170 that is directly opposite the flexible substrate 110. This allows a shortest distance between the target 150 and the flexible substrate 110 to be facilitated, increasing the signal strength and therefore the signal quality.

According to the innovative concept presented herein, the flexible substrate 110 is curved, which means that the first field coil 111, which is arranged thereon and runs in a straight line, and the first receiving coil arrangement 120, which is arranged thereon and runs in a straight line, are likewise curved and extend parallel to, e.g., at a constant distance from, the first coordinate line 151. The field coil 111 and the receiving coil arrangement 120 run not only parallel to the coordinate line 151 but also in the same direction as the coordinate line 151.

On account of this design, the first field coil 111 running in a straight line and the first receiving coil arrangement 120 running in a straight line each extend along the movement trajectory of the target 150 when the target 150 moves along the first coordinate line 151. The target 150 moving together with the component 170 can therefore always be positioned across from the substrate 110, or the coils 111, 120 arranged thereon, while movements are being carried out.

The curvature of the substrate 110 can substantially always correspond to the curvature of the coordinate line 151, e.g., the curvature of the substrate 110 can substantially correspond to the trajectory or the curved path on which the target 150 moves. As a result, the distance between the target 150 and the substrate 110 may be substantially constant over the entire path length of the movement of the target 150. That is to say that the target 150 can therefore move with a substantially constant air gap relative to the first field coil 111 and the first receiving coil arrangement 120. A constant air gap is desirable in order to obtain a constant signal quality. The air gap should be kept as small as possible in order to obtain the greatest possible signal strength.

Further advantages of the innovative inductive position measuring system 100 are explained with reference to the figures that follow. Since these figures are shown in a simplified form for the sake of clarity, however, reference will first of all be made to FIGS. 5 and 6, which are used to explain these simplifications. Features having an identical or similar function are referenced using the same reference signs in the figures, however.

Figure 5:
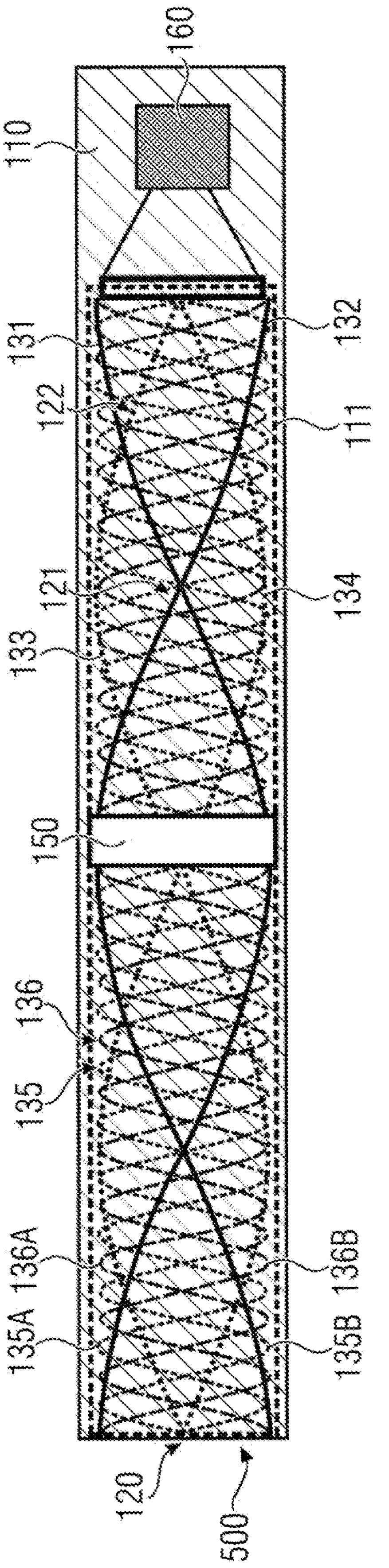
FIG. 5 shows a schematic plan view of an inductive position measuring system having additional coil arrangements for determining a relative position of the target according to one example implementation.

FIG. 5 shows substantially the same arrangement as FIG. 4, e.g., a flexible substrate 110 on which a previously discussed first field coil 111 and also an astatic sine coil 121 and an astatic cosine coil 122 are arranged. Additionally, a further coil arrangement 500 is optionally also arranged on the substrate 110 in the example implementation depicted in FIG. 5. This optional additional coil arrangement 500 comprises two astatic receiving coils 135, 136 arranged so as to each have a phase offset of 90° in relation to the other. The first receiving coil 135 comprises two windings 135A, 135B that have a phase offset of 180° in relation to one another. The second receiving coil 136 likewise comprises two windings 136A, 136B that have a phase offset of 180° in relation to one another.

The coils 135, 136 of the additional coil arrangement 500 can have the same amplitude or elongation as the sine coil 121 and the cosine coil 122. The number of executed oscillations (periods) of the individual coils 135, 136 of the additional coil arrangement 500 is distinctly greater than the oscillations of the sine coil 121 and the cosine coil 122 executed on the same route, however. The ratio of the executed oscillations may be 5:1 or greater, for example, e.g., the coils 135, 136 of the additional coil arrangement 500 may have at least 5 times more executed oscillations than the sine coil 121 and the cosine coil 122 arranged in the same path interval.

The coils 135, 136 of the additional coil arrangement 500, just like the sine coil 121 and the cosine coil 122, receive the induction field issuing from the target 150. On account of their larger number of periods, the coils 135, 136 also generate an output signal accordingly more often when the target 150 sweeps over the coils 135, 136. These output signals from the coils 135, 136 can be transmitted to the control unit 160 on a separate channel. A suitable combination of the output signals from the coils 135, 136 with the output signals from the sine coil 121 and the cosine coil 122 can be used to significantly increase the accuracy of the position determination. This substantially corresponds to the application of a nonius principle. By way of example, the sine coil 121 and the cosine coil 122 can be used to determine the absolute position of the target 150, and the coils 135, 136 can be used to ascertain a relative position of the target 150.

Figure 6:
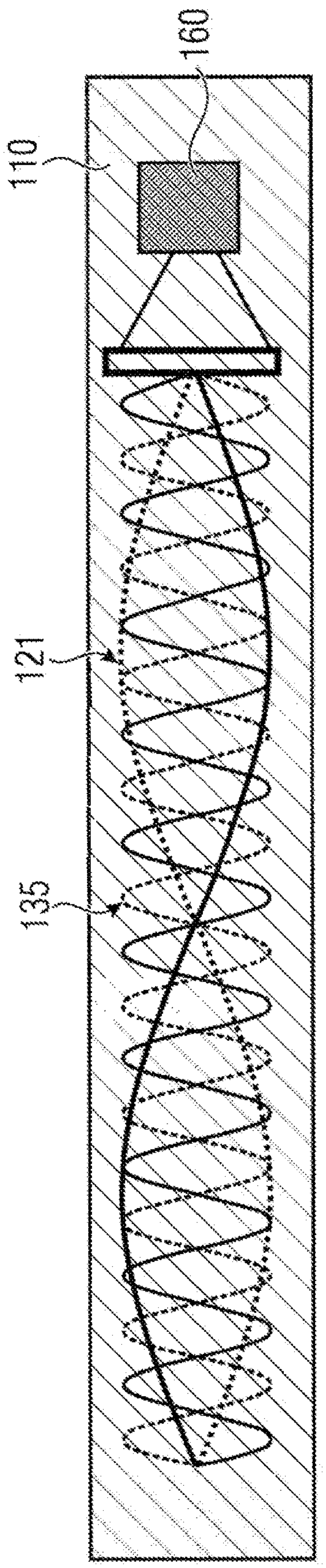
FIG. 6 shows a schematic plan view of an inductive position measuring system according to one example implementation in a simplified illustration.

As mentioned at the outset, the figures that follow are illustrated in a simplified form for the sake of better clarity. Such a simplification is depicted in FIG. 6. Here, only one of the two astatic receiving coils 121, 122 of the receiving coil arrangement 120 is shown, for example only the sine coil 121. Furthermore, only one of the two astatic coils 135, 136 of the additional coil arrangement 500 is shown, for example the astatic coil 135. It is self-evident in the description of the figures that follow, however, that the discussion always relates to both receiving coils 121, 122 of the receiving coil arrangement 120, e.g., both the sine coil 121 and the cosine coil 122. Equally, it goes without saying that the discussion always relates to both receiving coils 135, 136 of the additional receiving coil arrangement 500. The field coil 111 can also be omitted for the purposes of clearer illustration, even though it is present, of course.

On this premise, reference will first be made to the implementation depicted in FIG. 7. Here too, features having an identical or similar function are again referenced using the same reference signs as in the other figures.

Figure 7:
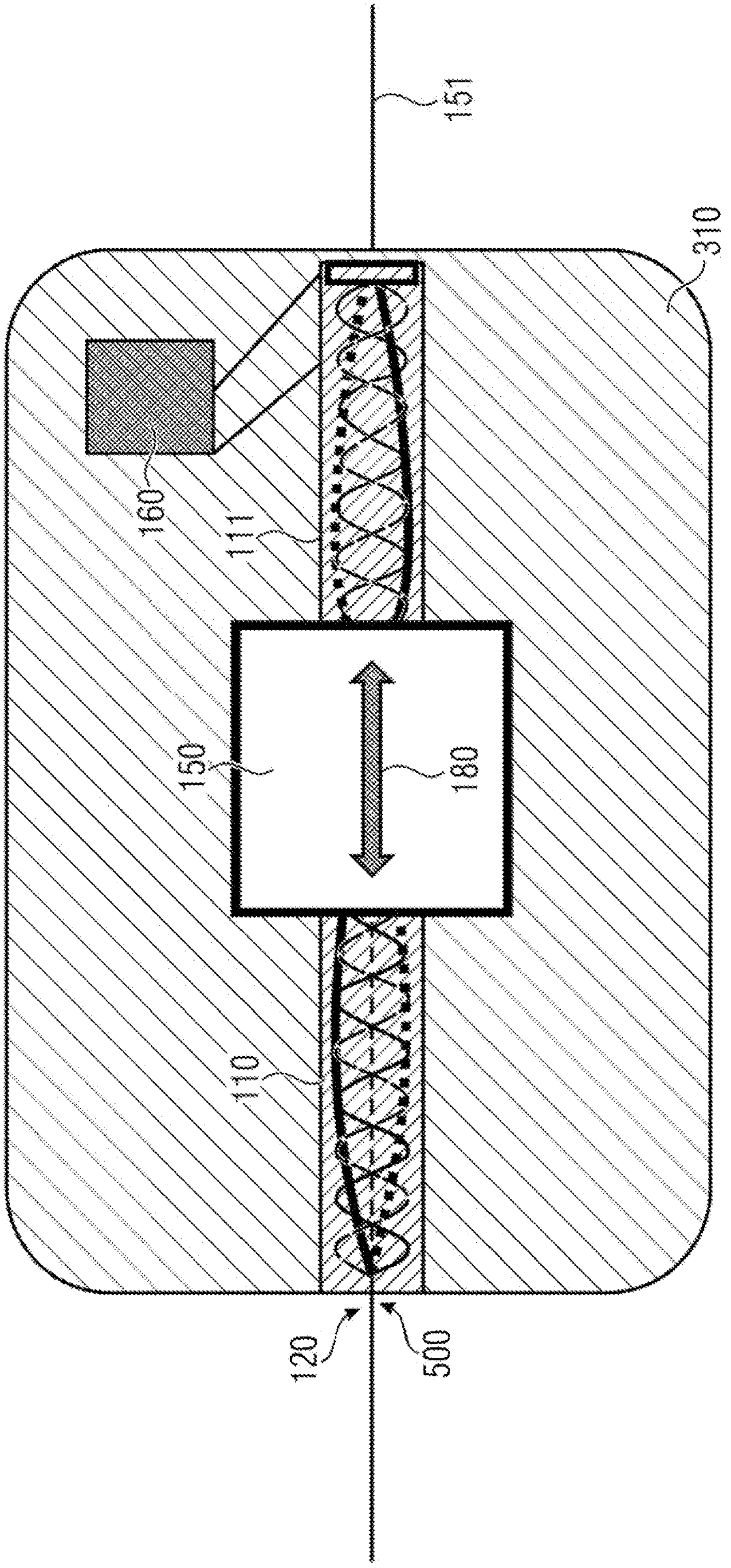
FIG. 7 shows a schematic plan view of an inductive position measuring system for measuring the position of a moving target having precisely one degree of freedom according to one example implementation.

FIG. 7 shows a plan view of the inductive measuring system 100. On account of the plan view, the previously discussed curvature of the substrate 110 is not visible here. However, this arrangement substantially corresponds to the example implementation discussed previously with reference to FIGS. 3 and 4 in which the target 150 moves along a circular path segment with only precisely one degree of freedom, this again being symbolized by the arrow 180 here too. The coordinate line 151 on which the target 150 moves is likewise shown.

The flexible substrate 110 may optionally be disposed on a larger substrate 310, for example in the form of a flex printed circuit board (PCB). By way of example, the larger substrate 310 may also be a pre-shaped structure, however, for example a bowl-shaped hollow hemisphere. This structure 310 may be manufactured from various materials, such as for example plastic composite materials. However, it would also be conceivable for the optional larger substrate 310 not to be present, and for the flexible substrate 110 to instead have the shape of the larger substrate 310 depicted here by way of illustration. That is to say that the entire substrate 310 depicted here would correspond to the flexible substrate 110.

As can also be seen, the target 150 has a different geometric shape than in the example implementation depicted in FIG. 4. In principle, the target 150 can have any geometric shapes. Advantageously, however, the target 150 should be dimensioned such that the extent thereof surrounds at least portions of the first field coil 111 and the first receiving coil arrangement 120 in a plan view when the target 150 moves along the first coordinate line 151.

That is to say that the target 150 always surrounds a part of the first field coil 111 and of the first receiving coil arrangement 120 when the target 150 moves. As a result, it is possible to ensure that the induction field and the opposing induction field are correctly set up over the entire route of the target 150, in order to ensure the previously described inductive measurement principle for determining the position of the target 150.

Figure 8:
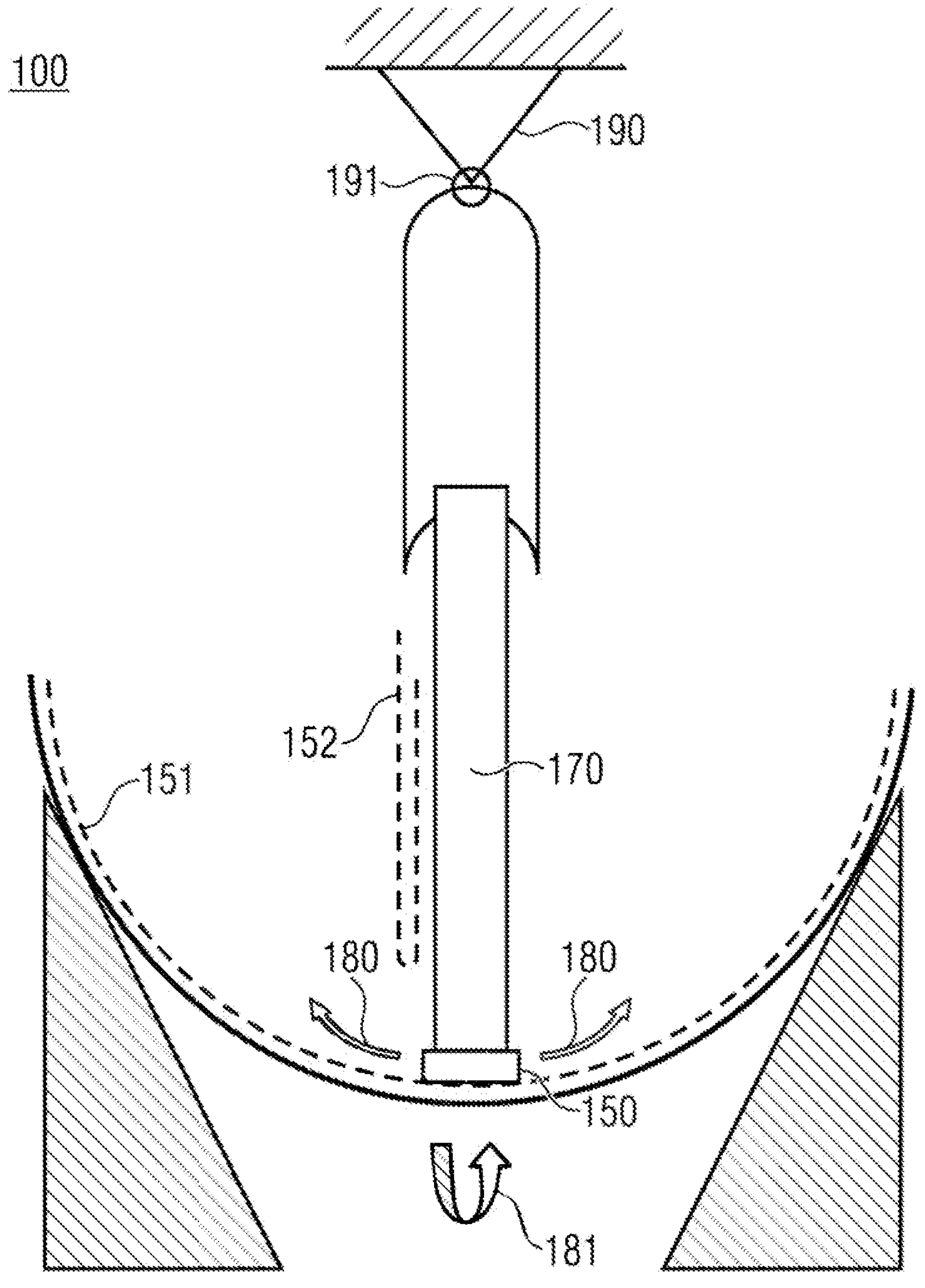
FIG. 8 shows a schematic side view of an inductive position measuring system for measuring the position of a moving target having precisely two degrees of freedom according to one example implementation.
Figure 9:
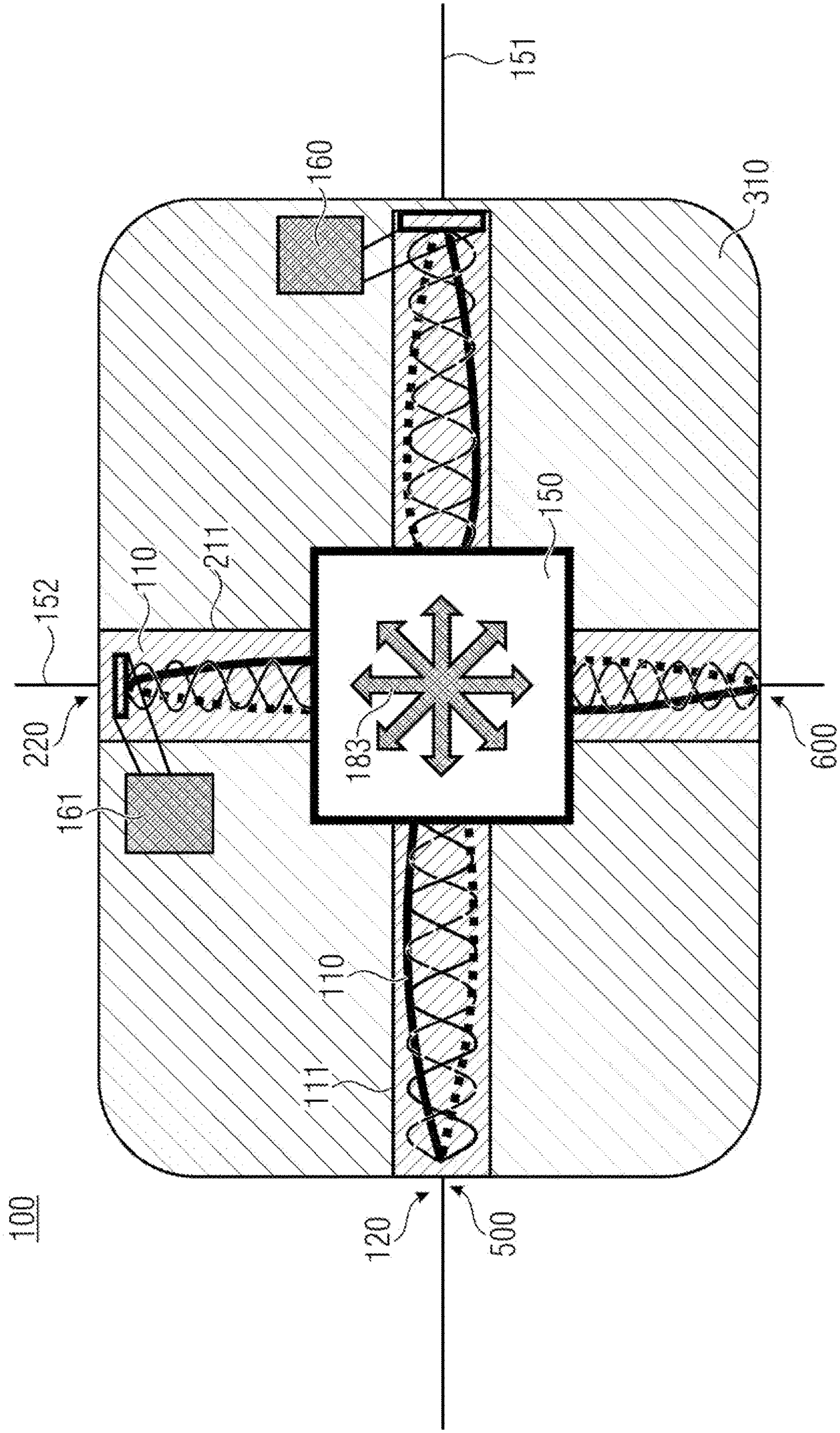
FIG. 9 shows a schematic plan view of an inductive position measuring system for measuring the position of a moving target having precisely two degrees of freedom according to one example implementation.

FIGS. 8 and 9 show further conceivable example implementations of the inductive position measuring system 100. The implementation shown in FIG. 8 substantially corresponds to the implementation discussed previously with reference to FIG. 3. One difference, however, is the manner in which the moving component 170 is mounted. In the example implementation depicted in FIG. 8, the bearing 190 has precisely two degrees of freedom. By way of example, this may be a U-joint 10 discussed with reference to FIG. 1.

Owing to the component 170 being mounted using a bearing that has two degrees of freedom, the component 170 likewise has two degrees of freedom, and it can therefore move both in the same direction of extension as the polar coordinate line 151 (see deflection direction 180) and at right angles thereto (see deflection direction 181). All directions in between are also possible. The same applies to the target 150 attached to the component 170.

That is to say that the target 150 can move either along the first polar coordinate line 151 or along a second polar coordinate line 151 running at right angles thereto. Owing to the two degrees of freedom that exist, the target 150 can also move both along the first polar coordinate line 151 and at the same time along the second polar coordinate line 152, however. In this case, the target 150 can thus move in all spatial directions that lie between the two polar coordinate lines 151, 152. In other words, stretching between the two curved polar coordinate lines 151, 152 may be a curved surface or plane within which the target 150 can move freely in all directions.

As can better be seen in the plan view depicted in FIG. 9, the target 150 can therefore move over the curved surface in all directions. This is shown symbolically using the multi-headed arrow symbol 183. If this plan view is transferred to the curvature discernible in FIG. 8, the target 150 can therefore carry out a movement along a spherical segment.

Implementations therefore provide for the moving component 170 together with the target 150 to be able to be deflected both along the first coordinate line 151 and at the same time along the second coordinate line 152 on a respective curved path, which means that the target 150 carries out a pivoting movement in two degrees of freedom, the resultant movement space of the target 150 being spherical-segment-shaped.

Although the target 150 can move over the curved surface in all directions, it may be sufficient if a second curved field coil 211 running in a straight line and a second curved receiving coil arrangement 220 running in a straight line are provided in order to be able to determine the current actual position of the target 150.

As shown in FIG. 9, the inductive position measuring system 100 can comprise a second field coil 211, for example, which is of substantially the same design as the first field coil 111 described previously. Moreover, the position measuring system 100 can comprise a second receiving coil arrangement 220, which is likewise of substantially the same design as the first receiving coil arrangement 120 described previously. That is to say that the second receiving coil arrangement 220 can also comprise an astatic sine coil and an astatic cosine coil.

The second field coil 211 and the second receiving coil arrangement 220 are again also shown only in a simplified form here. However, they substantially correspond to the arrangement as shown in FIG. 5.

Here too, there may furthermore optionally be provision for an additional coil arrangement 600 that substantially corresponds to the optional additional coil arrangement 500 described previously, in order to obtain a finer division for the position determination.

Whereas the first field coil 111 and the first receiving coil arrangement 120 are arranged such that they extend along the first curved polar coordinate line 151, the second field coil 211 and the second receiving coil arrangement 220 may be arranged such that they extend along the second curved polar coordinate line 152.

The first curved polar coordinate line 151 runs at right angles to the second curved polar coordinate line 151. The second field coil 211 and the second receiving coil arrangement 220 may therefore accordingly also be positioned at right angles to the first field coil 111 and the first receiving coil arrangement 120. This results in a cruciform arrangement, as shown by way of illustration in FIG. 9.

The position measuring system 100 can therefore ascertain the current actual position of the target 150 along the first coordinate line 151 using the first field coil 111 and the associated first receiving coil arrangement 120. The position measuring system 100 can additionally ascertain the current actual position of the target 150 along the second coordinate line 152, which runs at right angles thereto, using the second field coil 211 and the associated second receiving coil arrangement 220.

The inductive position measuring system 100 may be configured to combine the output signals from the first receiving coil arrangement 120 and the output signals from the second receiving coil arrangement 220 with one another in order to use them to infer coordinates (e.g., polar coordinates in spherical space) that indicate the current actual position of the target 150 on the curved surface.

This would correspond to a two-dimensional position determination (e.g., in the x and y directions) within a plane. According to an implementation that comprises a second field coil 211 and an associated second receiving coil arrangement 220, the current actual position of the target 150 can be ascertained over the entire curved surface.

The second field coil 210 and the second receiving coil arrangement 220 may likewise be arranged on the flexible substrate 110. By way of example, the flexible substrate 110 may be cruciform, in which case the respective coils 111, 120, 211, 220 would each be arranged on the four arms of the cross.

The second field coil 210 and the second receiving coil arrangement 220 could also be arranged on a second flexible substrate (not shown explicitly here), however, in which case the first and the second flexible substrate, as depicted, could cross.

The flexible substrate 110 and, if present, the optional second flexible substrate could each be arranged on the larger substrate 310. Here too, however, it would again be conceivable for the flexible substrate 110 to have the shape of the larger substrate 310 depicted by way of illustration here. That is to say that the entire substrate 310 depicted here would correspond to the flexible substrate 110 described herein. Here too, the first field coil 111, the first receiving coil arrangement 120, the second field coil 211 and the second receiving coil arrangement 220 would therefore again be arranged on the flexible substrate 110.

The second field coil 211 and the second receiving coil arrangement 220 may be coupled to the previously described control unit 160 (e.g., ASIC) for the purpose of signal processing. As shown by way of illustration in FIG. 9, however, it would also be conceivable for there to be able to be provision for a second control unit 161 that may be coupled to the second field coil 211 and the second receiving coil arrangement 220 for the purpose of signal processing.

Also, in the case of the second field coil 211 and the second receiving coil arrangement 220, the target 150 should advantageously be dimensioned such that the extent thereof surrounds at least portions of the second field coil 211 and the second receiving coil arrangement 220 in a plan view when the target 150 moves along the second coordinate line 152.

That is to say that the target 150 always surrounds a part of the second field coil 211 and of the second receiving coil arrangement 220 when the target 150 moves. As a result, it is possible to ensure that the induction field and the opposing induction field are correctly set up over the entire route of the target 150, in order to ensure the previously described inductive measurement principle for determining the position of the target 150.

As mentioned previously, the target 150 can move both along the first coordinate line 151 and at the same time along the second coordinate line 152. This means that the target 150 can move over the curved surface in all directions. The current actual position of the target 150 can be determined by processing both the output signals from the first receiving coil arrangement 120 and the output signals from the second receiving coil arrangement 220 in order to use them to ascertain the coordinates that represent the current actual position of the target 150 (comparable with an x and y value in the plane).

It is therefore advantageous if the target 150 is dimensioned such that the extent thereof always surrounds both the first field coil 111 and first receiving coil arrangement 120 and the second field coil 211 and second receiving coil arrangement 220 even if the target 150 moves along the first coordinate line 151 and at the same time also along the second coordinate line 152. Output signals from the first and the second receiving coil arrangement 120, 220 can therefore be received over the entire path of movement of the target 150 in order to ascertain the coordinates of the target 150, and therefore the current actual position thereof on the curved surface.

Even if the target 150 is deflected along the first coordinate line 151 as far as a specific point (e.g., to the maximum extent), the target 150 should nevertheless still cover (at least part of) the second field coil 211 and the associated second receiving coil arrangement 220 in order to obtain an output signal from the second receiving coil arrangement 220 for computing the coordinates of the target 150.

The same applies to a deflection of the target 150 along the second coordinate line 152. That is to say that even if the target 150 is deflected along the second coordinate line 152 as far as a specific point (e.g., to the maximum extent), the target 150 should nevertheless still cover (at least part of) the first field coil 111 and the associated first receiving coil arrangement 120 in order to obtain an output signal from the first receiving coil arrangement 120 for computing the coordinates of the target 150.

Example implementations therefore provide for the target 150 to be dimensioned such that the extent thereof surrounds at least portions of the first field coil 111 and the first receiving coil arrangement 120 in a plan view even if the target 150 moves as far as a predetermined (e.g., maximum) deflection along the second coordinate line 152. Alternatively, or additionally, the target 150 may be dimensioned such that the extent thereof surrounds at least portions of the second field coil 211 and the second receiving coil arrangement 220 in a plan view even if the target 150 moves as far as a predetermined (e.g., maximum) deflection along the first coordinate line 151.

Figure 10:
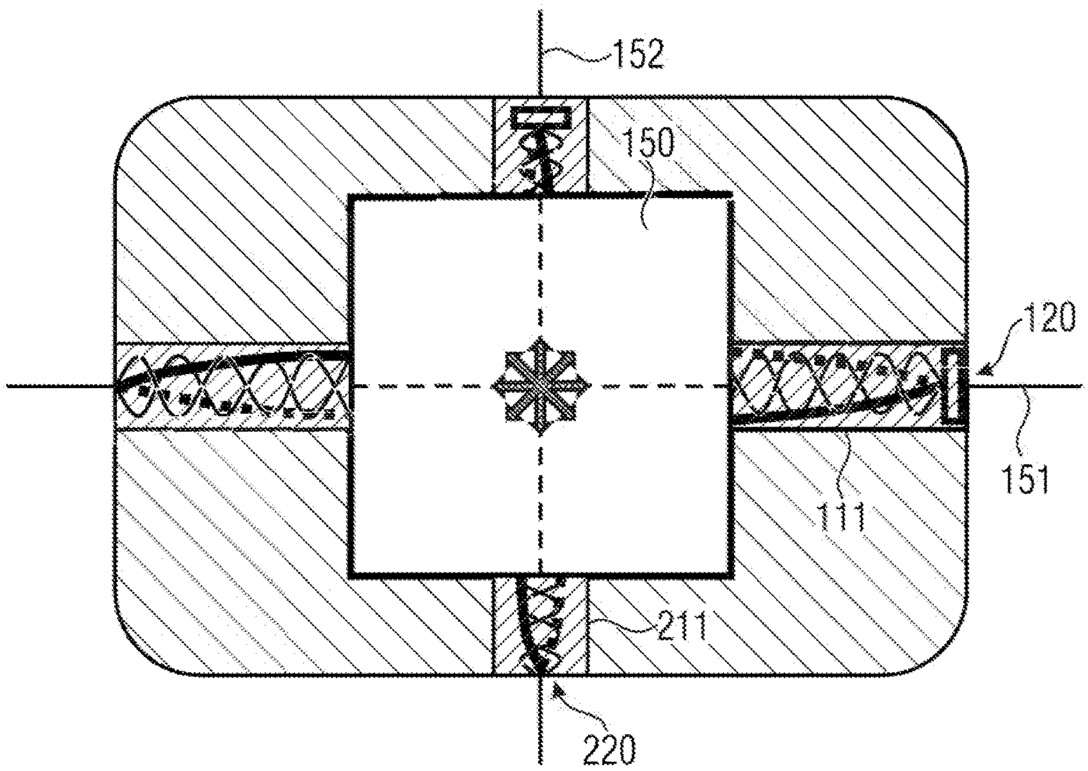
FIG. 10 shows a schematic plan view of an inductive position measuring system for measuring the position of a moving target having precisely two degrees of freedom according to another example implementation.
Figure 11:
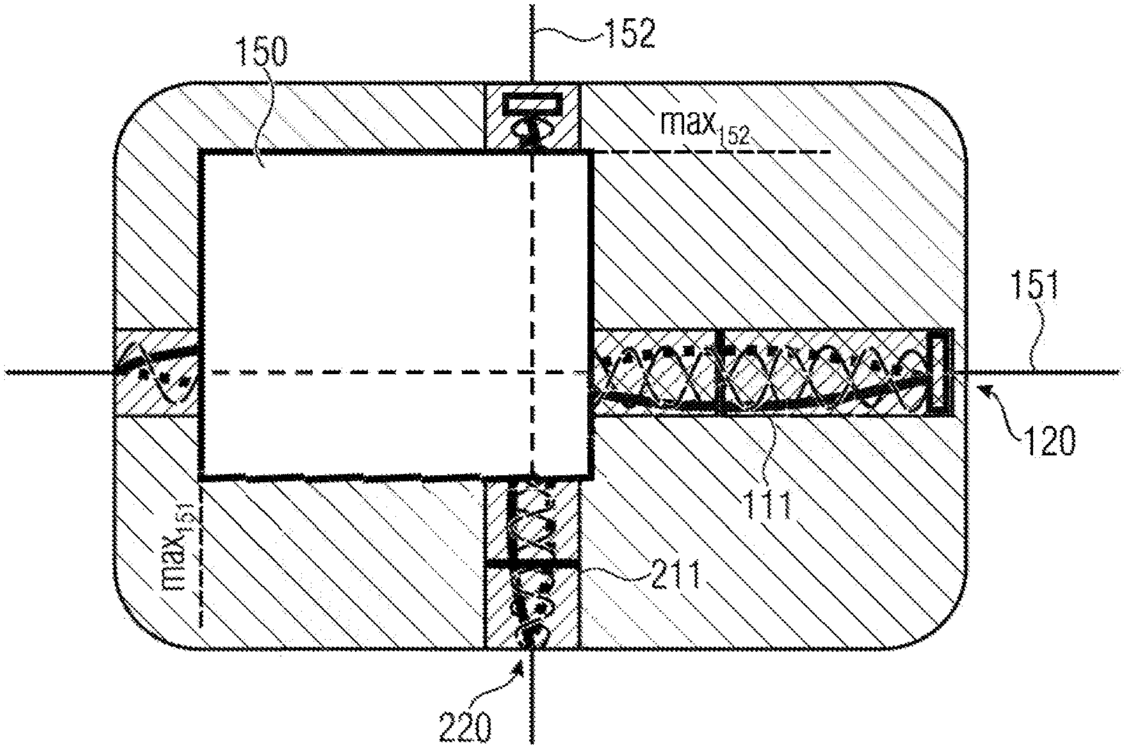
FIG. 11 shows a schematic plan view of an inductive position measuring system for measuring the position of a moving target having precisely two degrees of freedom according to another example implementation.

A nonlimiting illustrative design of the target 150 is shown in FIGS. 10 and 11. As can be seen in FIG. 10, the target 150 may be of one-piece design, wherein the target 150 in an undeflected resting position is positioned across from an intersection point at which the first field coil 111 and the first receiving coil arrangement 120 cross the second field coil 211 and the second receiving coil arrangement 220.

By way of example, the target 150 may have a surface that is so large that the extent of the target 150 always covers both the first field coil 111 and first receiving coil arrangement 120 and the second field coil 211 and second receiving coil arrangement 220.

FIG. 11 shows the target 150 in a maximum deflection along the first coordinate line 151 and along the second coordinate line 152. The maximum deflection along the first coordinate line 151 is denoted by the marking line max 151 shown in dashed lines. The maximum deflection along the second coordinate line 152 is denoted by the marking line max 152, which is likewise shown in dashed lines.

The surface of the target 150 is sufficiently large for the extent of the target 150 to still cover a part of the second field coil 211 and of the second receiving coil arrangement 220 even if the target 150 is deflected to the maximum extent along the first coordinate line 151. The surface of the target 150 is also sufficiently large for the extent of the target 150 to still cover a part of the first field coil 111 and of the first receiving coil arrangement 120 even if the target 150 is deflected to the maximum extent along the second coordinate line 152.

However, it may be that the target 150 cannot be provided with such large dimensions, for example owing to installation space limitations, or owing to merely limited space during installation on the moving component 170 itself. In this case, it may be advantageous to use a multipiece target 150.

Figure 12:
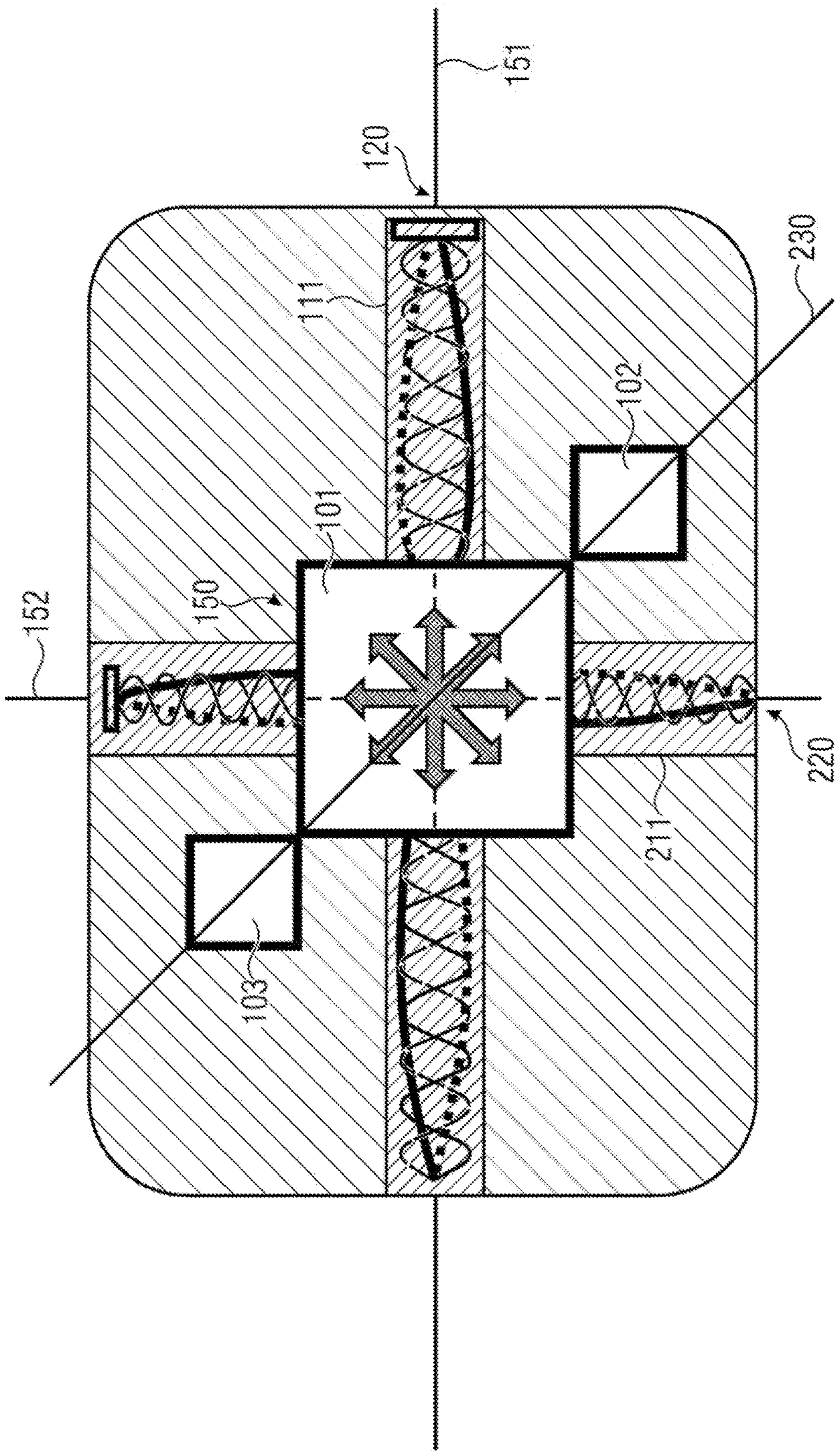
FIG. 12 shows a schematic plan view of an inductive position measuring system for measuring the position of a moving multipiece target having precisely two degrees of freedom according to another example implementation.

FIG. 12 shows a nonlimiting example of a multipiece target 150 in an undeflected resting position. The target 150 comprises a first target portion 101 that is positioned across from an intersection point at which the first field coil 111 and the first receiving coil arrangement 120 cross the second field coil 211 and the second receiving coil arrangement 220.

Figure 13:
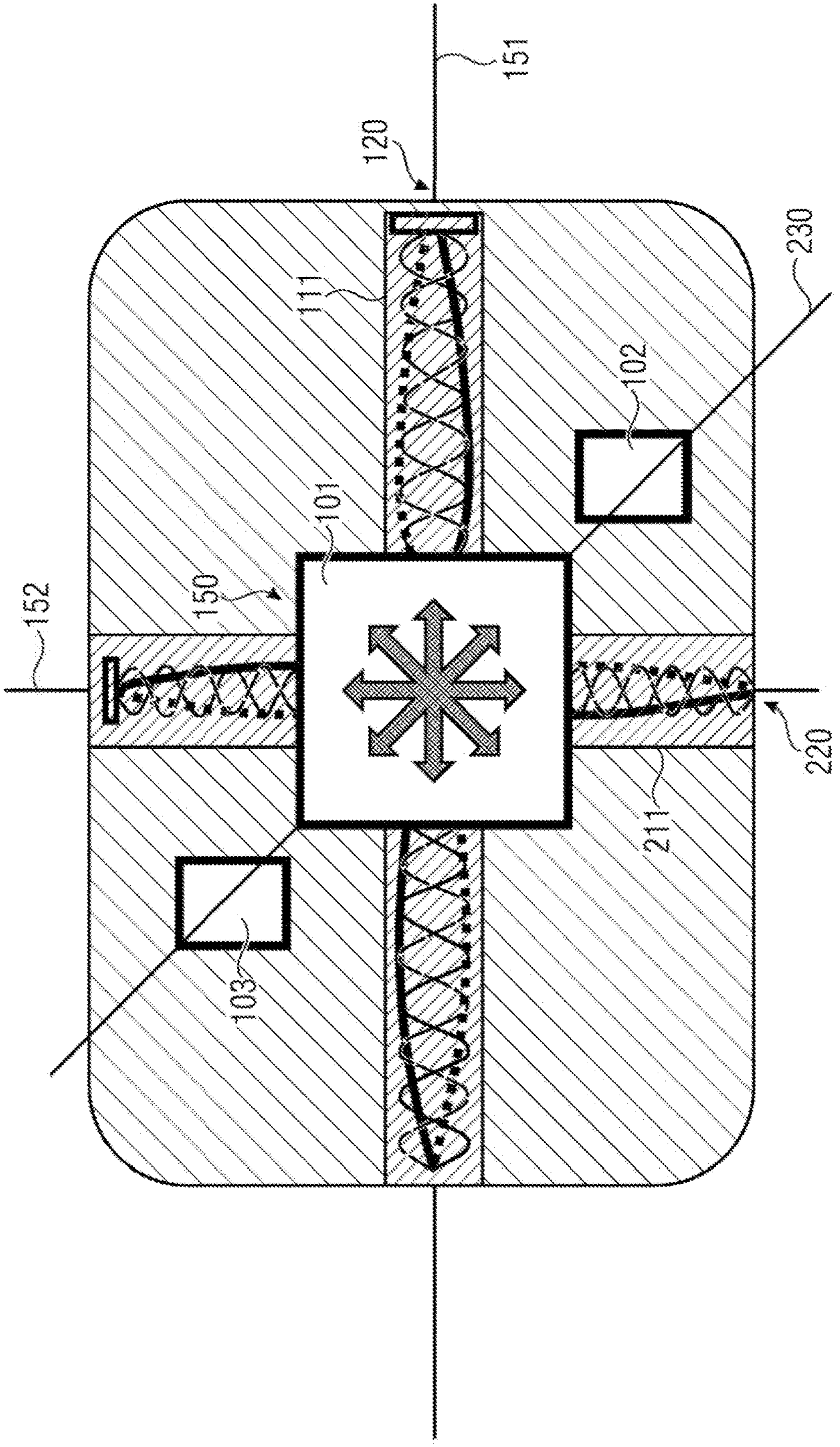
FIG. 13 shows a schematic plan view of an inductive position measuring system for measuring the position of a moving multipiece target having precisely two degrees of freedom according to another example implementation.

The target 150 further comprises a second target portion 102 that is positioned on a diagonal 230 running through the intersection point and through the first target portion 101. The second target portion 102 may be mechanically connected to the first target portion 101. The second target portion 102 may be directly adjacent to the first target portion 101, as shown by way of illustration in FIG. 12. The second target portion 102 may also be arranged remotely from the first target portion 101, however, as shown by way of illustration in FIG. 13.

The target 150 further comprises a third target portion 103 that is likewise positioned on this diagonal 230, but, viewed from the first target portion 101, is arranged across from the second target portion 102. The third target portion 103 may also be mechanically connected to the first target portion 101. The third target portion 103 may be directly adjacent to the first target portion 101, as shown by way of illustration in FIG. 12. The third target portion 103 may also be arranged remotely from the first target portion 101, however, as shown by way of illustration in FIG. 13.

This arrangement of the individual target portions 101, 102, 103 yields a multipiece target 150 having a geometric shape that corresponds more or less to a double eight. This results in a stronger output signal being received on the respective receiving coil arrangements 120, 220.

Moreover, the surface or overall size of the target 150 can be significantly reduced compared with the implementation shown in FIG. 11. Nevertheless, this specific geometry of the target 150 can be used to ensure that the extent of the target 150 still covers a part of the second field coil 211 and of the second receiving coil arrangement 220 even if the target 150 is deflected to the maximum extent along the first coordinate line 151.

By way of example, the second target portion 102 can cover the lower part of the second field coil 211 and of the second receiving coil arrangement 220 even if the target 150 were to be deflected to the maximum extent leftward (along the first coordinate line 151). Conversely, the third target portion 103 can cover the upper part of the second field coil 211 and of the second receiving coil arrangement 220 even if the target 150 were to be deflected to the maximum extent rightward (along the first coordinate line 151).

This specific geometry of the target 150 can also be used to ensure that the extent of the target 150 still covers a part of the first field coil 111 and of the first receiving coil arrangement 120 even if the target 150 is deflected to the maximum extent along the second coordinate line 152.

By way of example, the third target portion 103 can cover the left-hand part of the first field coil 111 and of the first receiving coil arrangement 120 even if the target 150 were to be deflected to the maximum extent downward (along the second coordinate line 152). Conversely, the second target portion 102 can cover the right-hand part of the first field coil 111 and of the first receiving coil arrangement 120 even if the target 150 were to be deflected to the maximum extent upward (along the second coordinate line 152).

Implementations are also conceivable in which the multipiece target 150 comprises only two of the three target portions 101 102, 103 depicted by way of illustration here. Implementations would also be conceivable in which the multipiece target 150 comprises more than the three target portions 101, 102, 103 depicted by way of illustration here.

In the example implementations discussed hitherto, the target 150 was in the form of a full-surface solid part. However, in all of the implementations discussed herein, it would also be conceivable for the target 150 to be in the form of an annular geometric hollow body. Annular means that the body is self-contained. The outer contour of the annular body may be arbitrary in this case.

By way of example, it may therefore be a hollow rectangle, a hollow cylinder and the like. By way of example, the target 150 may be in the form of a flat rectangle that is hollow inside, which means that substantially only the outer contours of the rectangle consist of solid material. This can be achieved by punching from a plate-shaped material, e.g., a metal sheet, for example.

Figure 14:
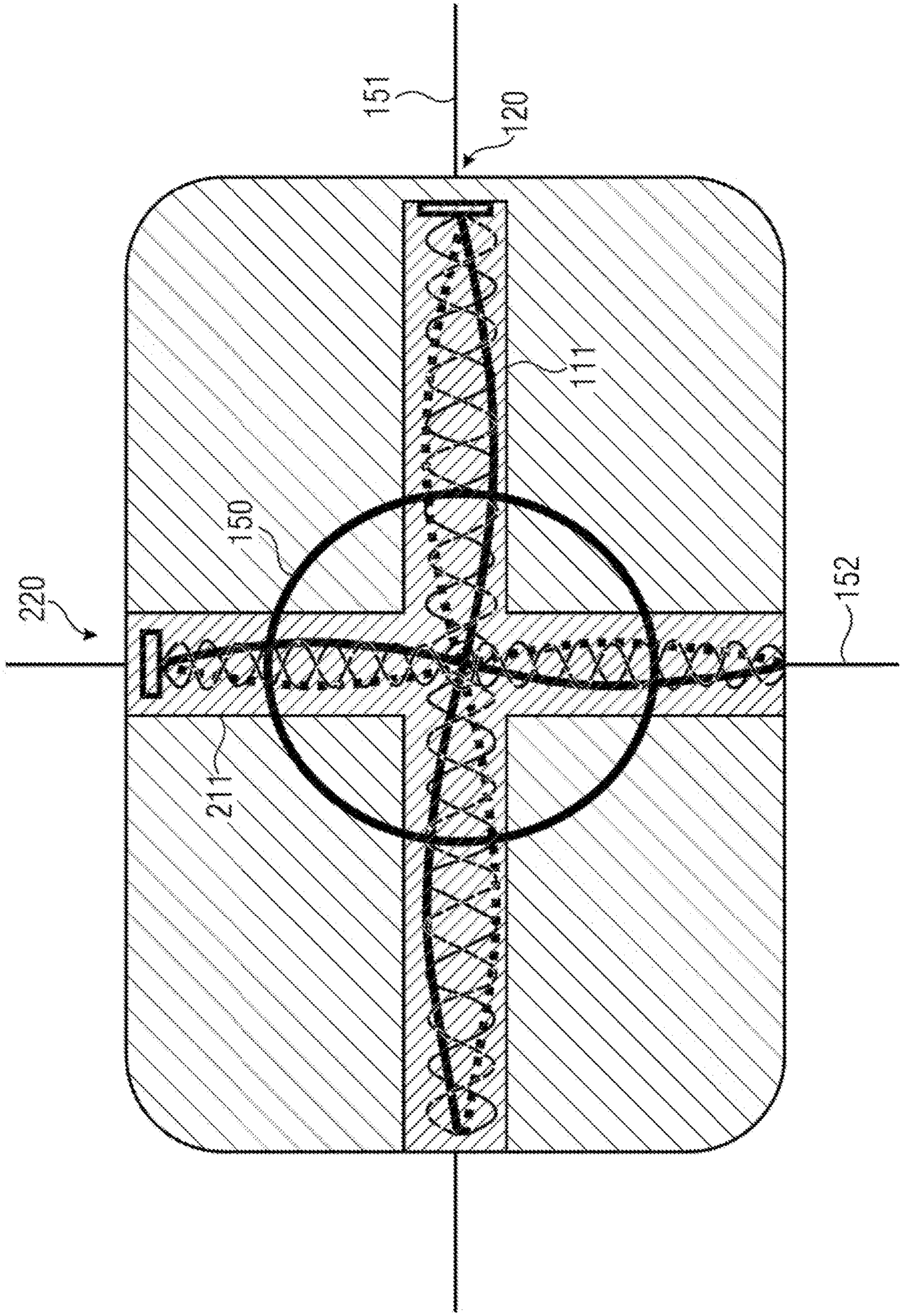
FIG. 14 shows a schematic plan view of an inductive position measuring system for measuring the position of a moving target, in the form of a geometric hollow body, having precisely two degrees of freedom according to another example implementation.

FIG. 14 shows a nonlimiting example implementation in which the target 150 is in the form of a circular annular hollow body. The circular hollow body may be flat, which means that it more or less has the shape of a circular annular plate. Alternatively, the circular hollow body may have a longitudinal extent, which means that it substantially has the shape of a hollow cylinder.

Figure 15:
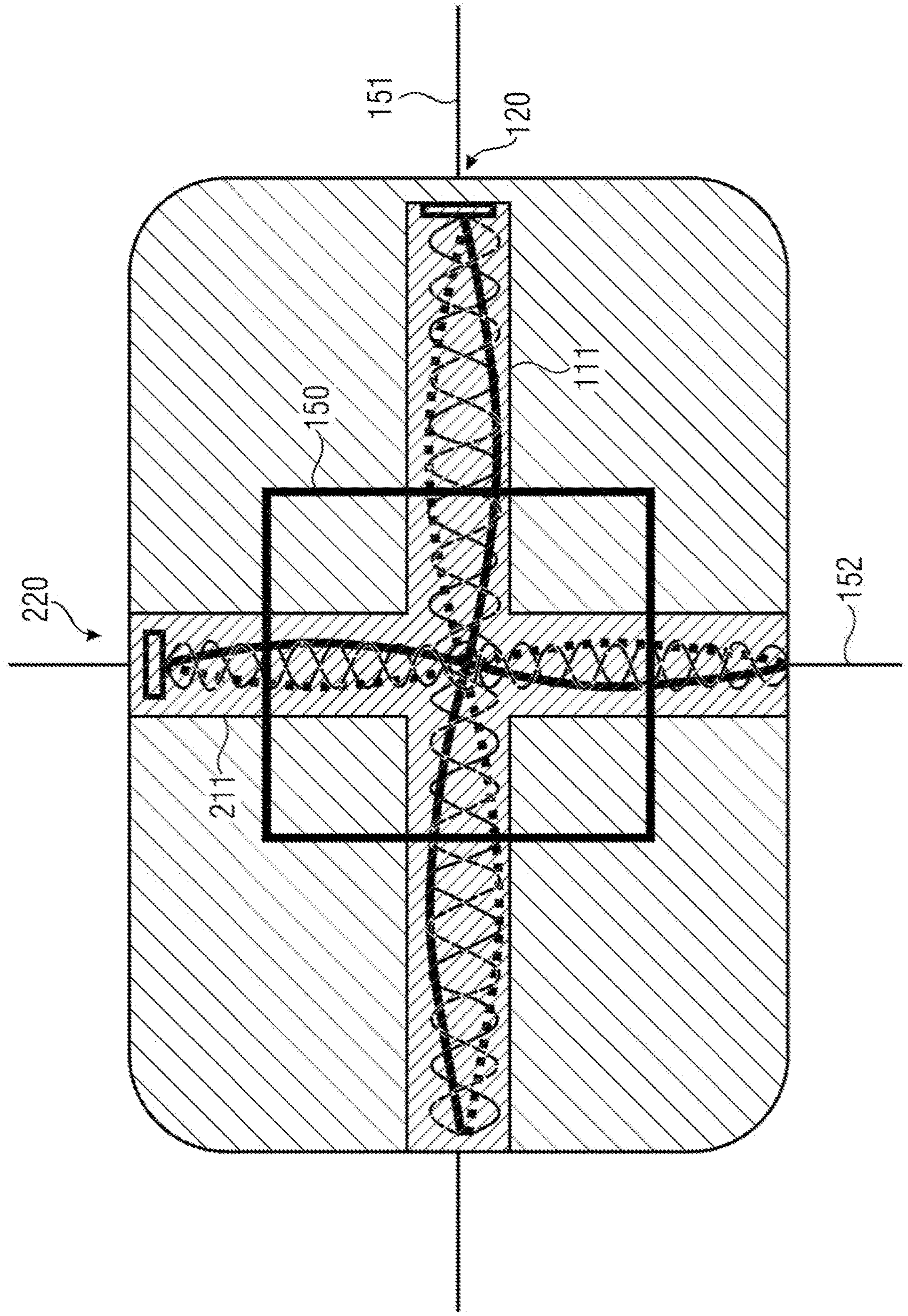
FIG. 15 shows a schematic plan view of an inductive position measuring system for measuring the position of a moving target, in the form of a geometric hollow body, having precisely two degrees of freedom according to another example implementation.

FIG. 15 shows another nonlimiting example implementation. Here, the target 150 is in the form of a rectangular hollow body. The rectangular hollow body may be flat, which means that it more or less has the shape of a rectangular annular plate. Alternatively, the rectangular hollow body may have a longitudinal extent, which means that it substantially has the shape of a hollow cuboid.

In all of the implementations, it is advantageous if the target 150 comprises metal or is made from metal. By way of example, the target 150 may be in the form of a metal plate or in the form of a metallization arranged on a carrier substrate.

The innovative concept described herein will be summarized once again below. The inductive position measuring system 100 allows an inductive measurement technique to be taken as a basis for measuring a two-dimensional movement. This can be facilitated using two sets of PCB coils 111, 120, 211, 220, flexible PCBs 110 and metal targets 150 arranged perpendicular to one another in a hollow annular or rectangular shape.

The two-dimensional movement just mentioned is a movement along an x axis and a y axis in a two-dimensional coordinate system. The bend or curvature of the x and y axes of the linear movement system allows a movement of a joint in a spatial coordinate system to be computed, provided that the invariable bend radius of the curved substrate 110 is known.

When a diagonal movement is carried out, all of the axes may be involved, and various implementations may be required in order to achieve an accurate position determination using the inductive position measuring system 100.

An inductive position sensor can comprise a transmitter coil Tx (field coil 111) and also two receiving coils Rx, Ry 121, 122 and a metallic target 150 that covers at least the Rx, Ry coil amplitudes. The Rx, Ry coils 121, 122 may be sinusoidal (Rx) or cosinusoidal (Ry) coils.

To determine an absolute position, a period of the sinusoidal and cosinusoidal receiver coils 121, 122 should run through the line of movement (trajectory) of the joint (comprising the metal target 150).

As shown in FIG. 6, for example, it may be a minimum requirement of one implementation for this implementation to contain at least the absolute position receiving coils 121, 122 (see the sine coil 121 shown by way of illustration). For the sake of clarity, the cosine coil 122 and the target 150 are not shown in FIG. 6.

In the example implementation shown in FIG. 6, it is possible to increase the accuracy for the two-dimensional movements with one or more channels, a nonius principle being able to be applied, or using a multiplicity of sensor periods over the entire linear range.

To be able to use the advantages of the inductive measurement principle for this type of two-dimensional movement, the innovative concept described herein provides for the substrate 110, e.g., in the form of a flexible PCB, to be bent together with the coil system 111, 120 situated thereon. In some example implementations, thin laminate-based PCBs can be used. Single-layer, double-layer or multilayer flex PCBs can advantageously also be used, however. Flex boards such as these can be used to produce different shapes and cuts in order to cover the circular range of movement beneath the joint, this being symbolized by the reference signs 110 and 151 in FIG. 4. Flex PCBs such as these moreover allow easy three-dimensional lamination of the flex PCB onto a circular base, which may be produced from various materials: plastic composites, etc. By way of example, a flex PCB can be bonded to a plastic half-tube.

Another important aspect relates to the geometry of the target 150. For the present inductive position measuring system 100, circular or rectangular targets 150 can be used. In some implementations, the target 150 is in the form of a metal rectangle, the width of which is determined based on the linear range of movement and the required accuracy. Hollow rectangles and circles having a specific frame width can preferably be used in order to cover the required surface beneath the target 150. This allows the induced current to itself induce an oppositely directed field in the receiving coils 121, 122, which facilitates the position determination.

The target 150 may also be in the form of a plastic part having a metallization layer, however. The metallization layer can comprise various metal alloys in order to improve the sensor characteristics: Ni—Au—Cu—Al alloys or combinations of one, two or more elements are possible.

The innovative position measuring system 100 described herein has the potential to drastically reduce the costs for determinations of joint positions for robots, and at the same time to increase the accuracy for the position determination. Conceivable fields of use are robot applications in almost all fields, but also all conceivable joystick applications and all applications in which currently complex mechanical systems are needed in order to translate movements to similar sensor concepts.

The innovative concept presented herein therefore allows two-dimensional movements to be detected using inductive sensors, and linear encoding to be provided for two-dimensional movements. The linear movement can be translated into a multidimensional signal processing. The innovative inductive position measuring system 100 presented here may moreover be in the form of the example implementations that follow, these being able to be combined with all other example implementations described herein.

According to one example implementation, the substrate 110 may be strip-shaped, wherein the field coil 110 running in a straight line and the receiving coil arrangement 120 running in a straight line each extend in the same direction as the strip-shaped substrate 110.

According to another example implementation, the strip-shaped substrate 110 may be curved in its direction of longitudinal extent.

According to another example implementation, the substrate 110 may be in the form of a single-layer or multilayer flexible film substrate.

According to another example implementation, the second field coil 211 and the second receiving coil arrangement 220 may be arranged on a second flexible and curved substrate.

According to another example implementation, the strip-shaped second substrate may be curved in its direction of longitudinal extent.

According to another example implementation, this second substrate may be strip-shaped, wherein the second field coil 211 running in a straight line and the second receiving coil arrangement 220 running in a straight line each extend in the same direction as the strip-shaped second substrate.

According to another example implementation, the second substrate may be in the form of a single-layer or multilayer flexible film substrate.

According to another example implementation, the first receiving coil arrangement 120 can comprise at least one first receiving coil 121 (e.g., Sin coil) and a second receiving coil 122 arranged offset therefrom (e.g., Cos coil), and/or the second receiving coil arrangement 220 can comprise at least one third receiving coil 221 (e.g., Sin coil) and a fourth receiving coil 222 arranged offset therefrom (e.g., Cos coil).

According to another example implementation, the field coil 111 may be configured to have an electrical signal applied to it in order to produce an induction field that produces a flow of electric current in the metallic target 150, the metallic target 150 being able to be configured to respond to the flow of current by producing an induction field that couples into the first receiving coil arrangement 120, whereupon the first receiving coil 121 generates a first output signal and the second receiving coil 122 generates a second output signal, the first and second output signals being dependent on the position of the target 150 relative to the receiving coil arrangement 120, and the inductive position measuring system 100 further being able to comprise a control unit 160 that is configured to combine the first and second output signals with one another (e.g., using a tan function) in order to take the result of this combination as a basis for ascertaining the position of the target 150.

According to another example implementation, the second field coil 211 may be configured to have an electrical signal applied to it in order to produce an induction field that produces a flow of electric current in the metallic target 150, the metallic target 150 being able to be configured to respond to the flow of current by producing an induction field that couples into the second receiving coil arrangement 220, whereupon the third receiving coil 221 generates a third output signal and the fourth receiving coil 222 generates a fourth output signal, the third and fourth output signals being dependent on the position of the target 150 relative to the receiving coil arrangement 220, and the inductive position measuring system 100 further being able to comprise a control unit 161 that is configured to combine the third and fourth output signals with one another (e.g., using a tan function) in order to take the result of this combination as a basis for ascertaining the position of the target 150.

The example implementations described above merely illustrate the principles of the innovative concept described herein. It goes without saying that modifications and variations of the arrangements and details described herein will be obvious to others skilled in the art. It is therefore intended for the concept described herein to be limited only by the scope of protection of the patent claims below, and not by the specific details that have been presented herein with reference to the description and the explanation of the example implementations.

Although some aspects have been described in connection with a device, it goes without saying that these aspects also constitute a description of the corresponding method, such that a block or a component of a device should also be understood as a corresponding method step or as a feature of a method step. Similarly, aspects that have been described in connection with or as a method step also constitute a description of a corresponding block or detail or feature of a corresponding device.

ASPECTS

The following provides an overview of some Aspects of the present disclosure:

Aspect 1: An inductive position measuring system, comprising: a flexible substrate having a first field coil and a first receiving coil arrangement, the first field coil and the first receiving coil arrangement each running along in a straight line on the flexible substrate; and a metallic target that is arranged at a distance from the flexible substrate and configured to provide an inductive coupling between the first field coil and the first receiving coil arrangement, wherein an actual position of the metallic target being determinable based on inductive coupling, wherein the metallic target is attached to a moving component that moves relative to the flexible substrate, the moving component together with the metallic target being able to be deflected along a first coordinate line on a curved path, wherein the flexible substrate is curved, and wherein the first field coil running in the straight line and the first receiving coil arrangement running in the straight line are curved based on a curvature of the flexible substrate and extend parallel to the first coordinate line.

Aspect 2: The inductive position measuring system as recited in Aspect 1, wherein the first field coil running in the straight line and the first receiving coil arrangement running in the straight line each extend along a movement trajectory of the metallic target when the metallic target moves along the first coordinate line.

Aspect 3: The inductive position measuring system as claimed in any of Aspects 1-2, wherein the curvature of the flexible substrate substantially corresponds to a curvature of the curved path on which the metallic target moves such that the metallic target moves with a substantially constant air gap relative to the first field coil and the first receiving coil arrangement.

Aspect 4: The inductive position measuring system as claimed any of Aspects 1-3, wherein the first coordinate line is a curved polar coordinate line such that the metallic target moves on a circular path segment while deflected along the first coordinate line.

Aspect 5: The inductive position measuring system as claimed in any of Aspects 1-4, wherein the metallic target is dimensioned such that an extent of the metallic target surrounds at least portions of the first field coil and the first receiving coil arrangement in a plan view when the metallic target moves along the first coordinate line.

Aspect 6: The inductive position measuring system as claimed in any of Aspects 1-5, further comprising: a second field coil and a second receiving coil arrangement, the second field coil and the second receiving coil arrangement each running in a second straight line, wherein the moving component together with the metallic target is able to be deflected along a second coordinate line on a second curved path, and wherein the second field coil running in the second straight line and the second receiving coil arrangement running in the second straight line are each curved and extend along the second coordinate line.

Aspect 7: The inductive position measuring system as recited in Aspect 6, wherein the first coordinate line and the second coordinate line run at right angles to one another such that the first field coil and the first receiving coil arrangement are arranged at right angles to the second field coil and the second receiving coil arrangement.

Aspect 8: The inductive position measuring system as recited in Aspect 6, wherein the moving component together with the metallic target is able to be deflected both along the first coordinate line and along the second coordinate line on respective curved paths such that the metallic target carries out a pivoting movement in two degrees of freedom with a resultant movement space of the metallic target being spherical-segment-shaped.

Aspect 9: The inductive position measuring system as recited in Aspect 6, wherein the metallic target is dimensioned such that an extent of the metallic target surrounds at least portions of the second field coil and the second receiving coil arrangement in a plan view when the metallic target moves along the second coordinate line.

Aspect 10: The inductive position measuring system as recited in Aspect 6, wherein the metallic target is dimensioned such that an extent of the metallic target surrounds at least portions of both the first field coil and first receiving coil arrangement and the second field coil and second receiving coil arrangement in a plan view when the metallic target moves along the first coordinate line and the second coordinate line, respectively.

Aspect 11: The inductive position measuring system as recited in Aspect 6, wherein the metallic target is dimensioned such that an extent of the metallic target surrounds at least portions of the first field coil and the first receiving coil arrangement in a plan view even if the metallic target moves as far as a predetermined deflection along the second coordinate line, or wherein the metallic target is dimensioned such that an extent of the metallic target surrounds at least portions of the second field coil and the second receiving coil arrangement in a plan view even if the metallic target moves as far as a predetermined deflection along the first coordinate line.

Aspect 12: The inductive position measuring system as claimed in any of Aspects 1-11, wherein the metallic target is in the form of a metal plate or in the form of a metallization arranged on a carrier substrate.

Aspect 13: The inductive position measuring system as claimed in any of Aspects 1-12, wherein the metallic target is in the form of a geometric hollow body.

Aspect 14: The inductive position measuring system as claimed in any of Aspects 1-13, wherein the metallic target is of a one-piece design, wherein the metallic target in an undeflected resting position is positioned across from an intersection point at which the first field coil and the first receiving coil arrangement cross the second field coil and the second receiving coil arrangement.

Aspect 15: The inductive position measuring system as recited in Aspect 6, wherein the metallic target is of a multipiece design, wherein in an undeflected resting position of the metallic target: a first target portion is positioned across from an intersection point at which the first field coil and the first receiving coil arrangement cross the second field coil and the second receiving coil arrangement, a second target portion is positioned on a diagonal running through the intersection point and through the first target portion, and a third target portion is positioned on the diagonal, but, viewed from the first target portion, is arranged across from the second target portion.

Aspect 16: A system configured to perform one or more operations recited in one or more of Aspects 1-15.

Aspect 17: An apparatus comprising means for performing one or more operations recited in one or more of Aspects 1-15.

What is claimed is:

1. An inductive position measuring system, comprising:

a flexible substrate having a first field coil and a first receiving coil arrangement, the first field coil and the first receiving coil arrangement each running along in a straight line on the flexible substrate, wherein the flexible substrate is curved; and a metallic target that is arranged at a distance from the flexible substrate and configured to provide an inductive coupling between the first field coil and the first receiving coil arrangement, wherein an actual position of the metallic target being determinable based on inductive coupling, wherein the metallic target is attached to a moving component that moves in accordance with a pendulous movement such that the metallic target moves on a curved path relative to a curvature of the flexible substrate, the moving component together with the metallic target being able to be deflected along a first coordinate line on the curved path, and wherein the first field coil running in the straight line and the first receiving coil arrangement running in the straight line are curved based on the curvature of the flexible substrate and extend parallel to the first coordinate line.

2. The inductive position measuring system as claimed in claim 1, wherein the first field coil running in the straight line and the first receiving coil arrangement running in the straight line each extend along a movement trajectory of the metallic target when the metallic target moves along the first coordinate line.

3. The inductive position measuring system as claimed in claim 1, wherein the curvature of the flexible substrate substantially corresponds to a curvature of the curved path on which the metallic target moves such that the metallic target moves with a substantially constant air gap relative to the first field coil and the first receiving coil arrangement.

4. The inductive position measuring system as claimed in claim 1, wherein the first coordinate line is a curved polar coordinate line such that the metallic target moves on a circular path segment while deflected along the first coordinate line.

5. The inductive position measuring system as claimed in claim 1, wherein the metallic target is dimensioned such that an extent of the metallic target surrounds at least portions of the first field coil and the first receiving coil arrangement in a plan view when the metallic target moves along the first coordinate line.

6. The inductive position measuring system as claimed in claim 1, further comprising:
a second field coil and a second receiving coil arrangement, the second field coil and the second receiving coil arrangement each running in a second straight line,
wherein the moving component together with the metallic target is able to be deflected along a second coordinate line on a second curved path, and
wherein the second field coil running in the second straight line and the second receiving coil arrangement running in the second straight line are each curved and extend along the second coordinate line.

7. The inductive position measuring system as claimed in claim 6, wherein the metallic target is dimensioned such that an extent of the metallic target surrounds at least portions of the second field coil and the second receiving coil arrangement in a plan view when the metallic target moves along the second coordinate line.

8. The inductive position measuring system as claimed in claim 6, wherein the metallic target is dimensioned such that an extent of the metallic target surrounds at least portions of both the first field coil and first receiving coil arrangement and the second field coil and second receiving coil arrangement in a plan view when the metallic target moves along the first coordinate line and the second coordinate line, respectively.

9. The inductive position measuring system as claimed in claim 6, wherein the metallic target is dimensioned such that an extent of the metallic target surrounds at least portions of the first field coil and the first receiving coil arrangement in a plan view even if the metallic target moves as far as a predetermined deflection along the second coordinate line, or
wherein the metallic target is dimensioned such that an extent of the metallic target surrounds at least portions of the second field coil and the second receiving coil arrangement in a plan view even if the metallic target moves as far as a predetermined deflection along the first coordinate line.

10. The inductive position measuring system as claimed in claim 6, wherein the metallic target is of a multipiece design, and
wherein in an undeflected resting position of the metallic target:
a first target portion is positioned across from an intersection point at which the first field coil and the first receiving coil arrangement cross the second field coil and the second receiving coil arrangement,
a second target portion is positioned on a diagonal running through the intersection point and through the first target portion, and
a third target portion is positioned on the diagonal, but, viewed from the first target portion, is arranged across from the second target portion.

11. The inductive position measuring system as claimed in claim 1, wherein the metallic target is in the form of a metal plate or in the form of a metallization arranged on a carrier substrate.

12. The inductive position measuring system as claimed in claim 1, wherein the metallic target is in the form of a geometric hollow body.

13. The inductive position measuring system as claimed in claim 6, wherein the metallic target is of a one-piece design, and
wherein the metallic target, in an undeflected resting position, is positioned across from an intersection point at which the first field coil and the first receiving coil arrangement cross the second field coil and the second receiving coil arrangement.

14. The inductive position measuring system as claimed in claim 1, wherein the distance from the flexible substrate is substantially constant over an entire path length of the curved path.

15. The inductive position measuring system as claimed in claim 14, wherein the metallic target is configured to move on the curved path with a substantially constant air gap relative to the first field coil and the first receiving coil arrangement.

16. The inductive position measuring system as claimed in claim 1, wherein the first receiving coil arrangement comprises multiple individual windings running in an undulating manner, and
wherein the first field coil is arranged in a conductor loop that is arranged circumferentially around first receiving coil arrangement.

17. An inductive position measuring system, comprising:
a flexible substrate having a first field coil and a first receiving coil arrangement, the first field coil and the first receiving coil arrangement each running along in a straight line on the flexible substrate;
a metallic target that is arranged at a distance from the flexible substrate and configured to provide an inductive coupling between the first field coil and the first receiving coil arrangement, wherein an actual position of the metallic target being determinable based on inductive coupling,
wherein the metallic target is attached to a moving component that moves relative to the flexible substrate, the moving component together with the metallic target being able to be deflected along a first coordinate line on a curved path,
wherein the flexible substrate is curved, and
wherein the first field coil running in the straight line and the first receiving coil arrangement running in the straight line are curved based on a curvature of the flexible substrate and extend parallel to the first coordinate line; and
a second field coil and a second receiving coil arrangement, the second field coil and the second receiving coil arrangement each running in a second straight line,
wherein the moving component together with the metallic target is able to be deflected along a second coordinate line on a second curved path,
wherein the second field coil running in the second straight line and the second receiving coil arrangement running in the second straight line are each curved and extend along the second coordinate line, and
wherein the first coordinate line and the second coordinate line run at right angles to one another such that the first field coil and the first receiving coil arrangement are arranged at right angles to the second field coil and the second receiving coil arrangement.

18. An inductive position measuring system, comprising:
a flexible substrate having a first field coil and a first receiving coil arrangement, the first field coil and the first receiving coil arrangement each running along in a straight line on the flexible substrate;
a metallic target that is arranged at a distance from the flexible substrate and configured to provide an inductive coupling between the first field coil and the first receiving coil arrangement, wherein an actual position of the metallic target being determinable based on inductive coupling, wherein the metallic target is attached to a moving component that moves relative to the flexible substrate, the moving component together with the metallic target being able to be deflected along a first coordinate line on a curved path, wherein the flexible substrate is curved, and wherein the first field coil running in the straight line and the first receiving coil arrangement running in the straight line are curved based on a curvature of the flexible substrate and extend parallel to the first coordinate line; and a second field coil and a second receiving coil arrangement, the second field coil and the second receiving coil arrangement each running in a second straight line, wherein the moving component together with the metallic target is able to be deflected along a second coordinate line on a second curved path, wherein the second field coil running in the second straight line and the second receiving coil arrangement running in the second straight line are each curved and extend along the second coordinate line, and wherein the moving component together with the metallic target is able to be deflected both along the first coordinate line and along the second coordinate line on respective curved paths such that the metallic target carries out a pivoting movement in two degrees of freedom with a resultant movement space of the metallic target being spherical-segment-shaped.

* * * * *